US012589368B2

(12) United States Patent
Takada et al.

(10) Patent No.: US 12,589,368 B2
(45) Date of Patent: Mar. 31, 2026

(54) GAS SUPPLY SYSTEM, MECHANICAL FOAMING SYSTEM, AND GAS SUPPLY METHOD

(71) Applicant: SUNSTAR ENGINEERING INC., Osaka (JP)

(72) Inventors: Masaharu Takada, Osaka (JP); Kiichi Yamashita, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 723 days.

(21) Appl. No.: 17/788,941

(22) PCT Filed: Dec. 27, 2019

(86) PCT No.: PCT/JP2019/051552
§ 371 (c)(1),
(2) Date: Jun. 24, 2022

(87) PCT Pub. No.: WO2021/131054
PCT Pub. Date: Jul. 1, 2021

(65) Prior Publication Data
US 2023/0039053 A1    Feb. 9, 2023

(51) Int. Cl.
B01F 23/235 (2022.01)
B01F 23/20 (2022.01)
(Continued)

(52) U.S. Cl.
CPC .......... B01F 23/235 (2022.01); B01F 23/291 (2022.01); B01F 35/7174 (2022.01); B01J 4/02 (2013.01); G05D 7/0635 (2013.01)

(58) Field of Classification Search
CPC .. B01F 23/235; B01F 23/291; B01F 35/7174; B01J 4/02; G05D 7/0635
(Continued)

(56) References Cited

U.S. PATENT DOCUMENTS 5,056,034 A * 10/1991 Rucki ....................... B29B 7/72
                                                            700/285
5,582,776 A * 12/1996 Crawley ............... B01F 23/291
                                                        261/DIG. 26
(Continued)

FOREIGN PATENT DOCUMENTS

CN      109562335 A  *  4/2019
EP      0 974 391        1/2000
(Continued)

OTHER PUBLICATIONS

English Machine Translation of JP 3320784 B2 (Year: 2002).*
(Continued)

*Primary Examiner* — Charles S Bushey
(74) *Attorney, Agent, or Firm* — Wenderoth, Lind & Ponack, L.L.P.

(57) ABSTRACT
The present invention allows measurement of a precise amount of gas by preventing sudden flow rate fluctuations of gas. A gas supply system 1a for a mixing-discharging apparatus 90 to mix gas and paste material includes a regulator 2 adapted to control pressure of gas supplied to the mixing-discharging apparatus, a flow meter 3 adapted to measure flow rate of the gas, a gas storage portion 4 adapted to store the gas, and a valve 5 adapted to open and close a gas introduction path 11 to the mixing-discharging apparatus 90. The flow meter 3 is placed in front of the gas storage portion 4 and behind the regulator 2 with respect to a flow of the gas.

26 Claims, 5 Drawing Sheets

(51) Int. Cl.
B01F 35/71 (2022.01)
B01J 4/02 (2006.01)
G05D 7/06 (2006.01)

(58) Field of Classification Search
USPC ................................................. 261/DIG. 26
See application file for complete search history.

(56) References Cited

U.S. PATENT DOCUMENTS

| | | | | |
|---|---|---|---|---|
| 5,984,280 | A * | 11/1999 | Okuda | .................... B29C 44/60 |
| | | | | 261/DIG. 26 |
| 6,538,040 | B1 * | 3/2003 | Okuda | ................ B29C 44/3446 |
| | | | | 261/DIG. 26 |
| 2006/0148909 | A1 | 7/2006 | Takada et al. | |
| 2013/0255793 | A1 | 10/2013 | Watanabe et al. | |
| 2018/0264421 | A1 | 9/2018 | Nakanish et al. | |

FOREIGN PATENT DOCUMENTS

| | | |
|---|---|---|
| EP | 1 591 219 | 11/2005 |
| JP | 11-128709 | 5/1999 |
| JP | 2000-289123 | 10/2000 |
| JP | 3320784 B2 * | 9/2002 |
| JP | 2009-66588 | 4/2009 |
| JP | 2009-160488 | 7/2009 |
| JP | 2013-229001 | 11/2013 |
| JP | 2017-75656 | 4/2017 |
| WO | 2004/060628 | 7/2004 |
| WO | 2016/125900 | 8/2016 |

OTHER PUBLICATIONS

English Machine Translation of CN 109562335 A (Year: 2019).*
International Search Report issued Mar. 17, 2020 in International Application No. PCT/JP2019/051552.
Extended European Search Report issued Oct. 30, 2020 in corresponding European Patent Application No. 19874749.5.
Office Action issued Aug. 16, 2021 in in corresponding European Patent Application No. 19874749.5.
Office Action issued Dec. 10, 2021 in in corresponding European Patent Application No. 19874749.5.

* cited by examiner

GAS SUPPLY SYSTEM, MECHANICAL FOAMING SYSTEM, AND GAS SUPPLY METHOD

TECHNICAL FIELD

The present invention relates to a gas supply system for a mixing-discharging apparatus to mix gas and paste material, a mechanical foaming system equipped with the gas supply system, and a method for supplying gas in the mechanical foaming system.

BACKGROUND ART

There is a known technique for precisely measuring the gas from a gas supply source with a flow meter and supplying the gas to a vacuum chamber (PTL 1 listed below).

Examples of fields that use such a technique include the field of mixing-discharging apparatuses to mix gas and paste material. With the mixing-discharging apparatus, to achieve a predetermined expansion ratio, it is necessary to precisely measure an amount of gas for a fixed amount of paste material. Therefore, in the mixing-discharging apparatus, a regulator, a flow meter, and a valve are placed in a gas supply path to supply gas from the gas supply source to the vacuum chamber and a fixed amount of gas is supplied to the vacuum chamber or a low-pressure chamber by opening/closing the valve while measuring a flow rate of the gas with a flow meter, the gas being pressure-controlled and kept at constant pressure by the regulator.

However, when the valve is opened, if a pressure difference between a gas flow path and the vacuum chamber is extremely large, gas flows suddenly from the gas flow path to the vacuum chamber. In so doing, the gas flowing in can reach a maximum flow rate instantly in a shorter time than sampling time of the flow meter. There is a problem in that during the instantaneous flow rate fluctuation occurring in a shorter time than the sampling time, accuracy of the gas flow rate measured by the flow meter deteriorates, making it impossible to measure a precise amount of gas.

CITATION LIST

Patent Literature

PTL 1: Japanese Patent Laid-Open No. 2013-229001

SUMMARY OF INVENTION

Technical Problem

The present invention has been made in view of the above facts and has an object to provide a gas supply system for a mixing-discharging apparatus to mix gas and paste material, the gas supply system allowing measurement of a precise amount of gas by preventing sudden flow rate fluctuations of gas, as well as to provide a mechanical foaming system equipped with the gas supply system and a method for supplying gas in the mechanical foaming system.

Solution to Problem

To solve the above problem, the present invention provides a gas supply system comprising: a regulator adapted to control pressure of gas supplied from a gas supply source; a flow meter adapted to measure flow rate of the gas; a gas storage portion adapted to store the gas; and a valve adapted to open and close a gas introduction path to the mixing-discharging apparatus.

The flow meter is placed upstream the gas storage portion and downstream the regulator with respect to a flow of the gas.

In the gas storage portion, a volume ratio of the gas storage portion to the predetermined volume of the piston pump is established such that flow rate fluctuations in a flow path in which the flow meter is placed fall within a predetermined range when the valve is open and gas is supplied to the piston pump of the mixing-discharging apparatus. For example, the volume ratio of the gas storage portion to the predetermined volume of the piston pump is between 4 and 100, between 8 and 50, or between 12 and 20. For example, a volume of the gas storage portion is 20 cc to 2000 cc. Preferably material of the gas storage portion is SUS.

Preferably the regulator is a precision regulator. For example, the precision regulator is a constant bleed regulator or a nozzle flapper regulator.

Preferably the gas supply system further comprises a check valve installed on a gas flow path between the gas storage portion and the valve. Preferably a pressure difference between front and back of the check valve is 0.01 MPa or less when gas does not flow. Preferably pressure of gas supplied to the regulator is 1 MPa or less.

The gas supply system according to the present invention further comprises a controller adapted to control the gas supply system, wherein the controller carries out the steps of: opening the valve in a state where the gas supplied from the gas supply source is subjected to pressure regulation by the regulator and stored in the gas storage portion, thereby sending gas into a space of the predetermined volume of the piston pump and storing the gas therein, measuring the flow rate of the gas with the flow meter, calculating an amount of the gas stored in the piston pump from the flow rate of the gas measured by the flow meter, and closing the valve when a predetermined closing condition is satisfied.

The controller may determine whether the calculated amount of the gas stored in the piston pump falls within a preset range between upper and lower limits and issue a system stop command when the amount of the gas falls outside the range between the upper and lower limits.

The preferred gas supply system of the present invention further comprises a display unit adapted to display the calculated amount of the gas stored in the piston pump and a range between upper and lower limits of the amount of the gas, representing an appropriate range of the amount of gas. The display unit may further display time variation of the flow rate measured by the flow meter.

More preferably the gas supply system further comprises a pressure gage adapted to detect pressure of the gas, the pressure gage being installed on a gas flow path between the gas storage portion and the valve.

The predetermined closing condition for closing the valve can be set to any of conditions (1) to (3):

(1) a gas flow rate measured by the flow meter falls to 0 or falls to or below a threshold, (2) gas pressure fluctuations detected by the pressure gage disappear or a pressure fluctuation range of the gas falls to or below a threshold, and (3) a predetermined time elapses after the valve is opened.

The gas storage portion of the present invention can be configured as a gas tank. Alternatively, the gas storage portion may be made up of a pipe having a length and a sectional area that achieve a predetermined volume ratio to a predetermined volume of the piston pump.

A mechanical foaming system of the present invention comprises: the gas supply system; and a mixing-discharging apparatus equipped with a piston pump supplied with gas from the gas supply system.

A mechanical foaming system according to a first aspect of the present invention further comprises a controller adapted to control the gas supply system and the mixing-discharging apparatus, wherein: the piston pump of the mixing-discharging apparatus includes: a cylinder connected to the gas supply system, and a piston driven up and down in the cylinder; the mixing-discharging apparatus further includes: a material supply apparatus adapted to supply paste material, a conduit for the paste material, the conduit being connected to the material supply apparatus, and a discharge valve adapted to open/close a gas supply path from the cylinder to the conduit; and the controller carries out the steps of; moving up the piston in the cylinder with the discharge valve closed, introducing gas from the gas supply system into a cylinder space formed in the cylinder by upward movement of the piston and having a fixed volume, pouring a fixed amount of the paste material to the conduit from the material supply apparatus, compressing the gas by moving down the piston, and opening the discharge valve and thereby mixing discharged gas in the paste material.

A mechanical foaming system according to a second aspect of the present invention further comprises a controller adapted to control the gas supply system and the mixing-discharging apparatus, wherein: the piston pump of the mixing-discharging apparatus includes: a cylinder connected to the gas supply system, and a piston driven up and down in the cylinder; the mixing-discharging apparatus further includes: a material supply apparatus adapted to supply paste material, a material valve installed between the material supply apparatus and the cylinder; and the controller carries out the steps of: moving up the piston in the cylinder with the material valve closed, introducing gas from the gas supply system into a cylinder space formed in the cylinder by upward movement of the piston and having a fixed volume, supplying the paste material to the cylinder space from the material supply apparatus by opening the material valve; and discharging the gas and the paste material from the cylinder by moving down the piston.

According to the present invention, there is provided a method for supplying gas to the piston pump in the mechanical foaming system according to the first or second aspect, the method comprising the steps of: opening the valve in a state where the gas supplied from a gas supply source is subjected to pressure regulation by the regulator and stored in the gas storage portion, thereby sending gas into a space of the predetermined volume of the piston pump and storing the gas therein; measuring the flow rate of the gas with the flow meter; calculating an amount of the gas stored in the cylinder space formed in the cylinder by upward movement of the piston and having a fixed volume from the flow rate of the gas measured by the flow meter; and closing the valve when a predetermined closing condition is satisfied.

The predetermined closing condition for closing the valve can be any of the above conditions.

Preferably the method of the present invention further comprises the steps of; determining whether the calculated amount of the gas stored in the cylinder space falls within a preset range between upper and lower limits and stopping the mechanical foaming system when the amount of the gas falls outside the range between the upper and lower limits.

The present method further comprises the steps of: closing the valve, moving down the piston, and then mixing the gas and the paste material. The method further comprises a step of discharging and applying the mixed gas and paste material on a surface.

DESCRIPTION OF EMBODIMENTS

Embodiments of the present invention will be described below with reference to the drawings.

First Embodiment

Figure 1:
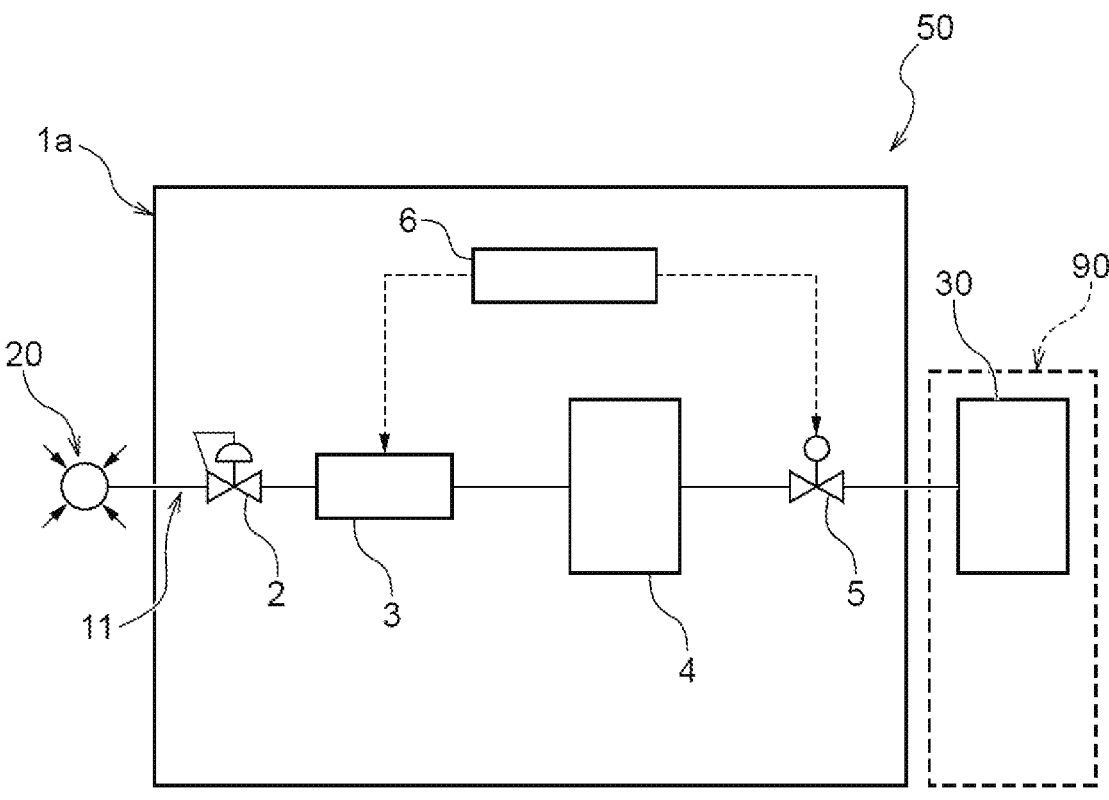
FIG. 1 is a block diagram of a gas supply system according to a first embodiment of the present invention.

FIG. 1 shows a gas supply system 1a according to a first embodiment of the present invention.

The gas supply system 1a according to the first embodiment is configured to supply gas to a mixing-discharging apparatus 90 adapted to mix and discharge gas and paste material. The mixing-discharging apparatus 90 includes a piston pump 30 to mix the gas and paste material and the gas supply system 1a supplies the gas to the piston pump 30. The gas supply system 1a and the mixing-discharging apparatus 90 make up a mechanical foaming system 50 as a whole.

On a gas introduction path 11 from a gas supply source 20 to the piston pump 30, the gas supply system 1a has a regulator 2 adapted to control pressure of gas sent from the gas supply source 20, a flow meter 3 adapted to measure flow rate of the gas, a gas storage portion 4 adapted to store a predetermined volume of gas, a valve 5 adapted to open and close the gas introduction path, and a flow rate controller 6 adapted to determine whether the gas flow rate measured by the flow meter 3 is appropriate. The flow meter 3 is placed in front of the gas storage portion 4 and behind the regulator 2 with respect to a flow of the gas.

The gas storage portion 4 can be configured as a gas tank. However, the gas storage portion 4 of the present invention is not limited to the gas tank shown as an example, and may take any form as long as a predetermined volume of gas can be stored. For example, the length and inner sectional area of the gas introduction path 11 can be set such that a gas volume determined by the length and inner sectional area of the gas introduction path 11 between the flow meter 3 and valve 5 will equal the predetermined volume. The larger the predetermined volume, the longer the gas introduction path 11 and the longer the gas supply unit, but, for example, by forming a long pipe into a curved shape such as a spiral shape, the overall length can be reduced. Of course, one section of the gas introduction path 11 as a predetermined gas storage portion may be linear, or the cross-sectional area of the gas introduction path 11 may be varied depending on the location.

While the valve 5 is closed, the piston pump 30 creates a predetermined volume of vacuum in a cylinder by moving up a piston of the piston pump to a top dead center. When gas is sent to the cylinder from the gas supply system 1*a* by opening the valve 5 and gas pressure reaches a fixed pressure, this means that an amount of gas determined by a cylinder volume of the piston pump 30 and the fixed pressure has been supplied to the cylinder of the piston pump 30. According to the embodiment of the present invention, instead of directly measuring an amount of gas flowing into the cylinder, the amount of gas is measured on a supply side beforehand. That is, after the gas supplied from the gas supply source 20 is adjusted to constant pressure by the regulator 2, a flow rate is measured by the flow meter 3. If the flow rate measured by the flow meter 3 is integrated over measuring time, the amount of gas supplied to a cylinder space of the piston pump 30 at the constant pressure can be found, and it can be determined whether the amount of gas is an amount set for cylinder capacity of the piston pump 30.

Preferably the regulator 2 is a precision regulator. Examples of such a regulator include a constant bleed regulator and nozzle flapper regulator.

A volume ratio of the gas storage portion 4 to the predetermined volume of the piston pump 30 has been established such that flow rate fluctuations in a flow path in which the flow meter 3 is placed will fall within a predetermined range when the valve 5 is opened and gas is supplied to the piston pump 30 of the mixing-discharging apparatus 90. Preferably a lower limit of a gas volume ratio of the gas storage portion 4 is 4 or above, more preferably 8 or above, and still more preferably 12 or above. This is because too small a gas volume ratio will result in an increased pressure drop when the valve 5 is opened and thus in a sudden increase in the reading of the flow meter 3, deteriorating the measurement accuracy of the flow meter 3. Preferably an upper limit of the gas volume ratio of the gas storage portion 4 is 100 or below, more preferably 50 or below, and still more preferably 20 or below. This is because too large a gas volume ratio of the gas storage portion 4 will cause a pressure difference to decrease too much with changes in the gas flow rate, creating a tendency for gas measurement accuracy to deteriorate.

Preferably the gas volume of the gas storage portion 4 is 20 cc to 2000 cc, whereas the cylinder volume of the piston pump 30 is about 5 cc, 10 cc, 20 cc, or 100 cc. This gas volume suitable for the gas storage portion 4 is extremely small compared to the volume of an air storage unit normally installed in an airline to consume a great amount of air. This is because whereas the gas storage portion 4 according to the embodiment of the present invention plays the role of a buffer adapted to prevent sudden flow rate fluctuations, an absolute amount of air supply is important for the air storage unit.

Also, preferably material of the gas storage portion 4 is SUS high in rigidity to keep the gas volume constant.

Next, workings of the gas supply system 1*a* according to the first embodiment will be described.

As a preliminary stage, when gas is supplied to the gas introduction path 11 from the gas supply source 20 with the valve 5 closed, the regulator 2 adjusts the gas pressure to a predetermined pressure, the flow meter 3 measures the gas flow rate, and a signal about the gas flow rate is sent to the flow controller 6. Since the valve 5 is closed, the gas passing through the flow meter 3 is stored in the gas storage portion 4.

The flow controller 6, which monitors the gas flow rate measured by the flow meter 3, determines whether a predetermined amount of the gas whose pressure has been adjusted by the regulator 2 has passed through the flow meter 3. The flow controller 6 further determines whether the pressure between the gas storage portion 4 and valve 5 indicates a fixed pressure and whether the reading of the flow meter 3 is zero. When the flow controller 6 determines that the above conditions are satisfied and gas is ready to be introduced into the mixing-discharging apparatus 90 (e.g., the piston of the piston pump 30 is at the top dead center), the valve 5 can be opened.

When the valve 5 is opened, gas is sent into the cylinder space of the piston pump 30 and stored therein, and when predetermined closing conditions described later are satisfied, the valve 5 is closed. During a period after the valve 5 is opened until the valve 5 is closed, the flow meter 3 measures the flow rate, and based on the measured flow rate, the flow controller 6 calculates the amount of gas stored in the cylinder space formed in the cylinder by upward movement of the piston and having a fixed volume. Based on the calculated amount of gas, it becomes possible to determine whether a predetermined amount of gas has been stored in the cylinder space.

When the valve 5 is opened, the gas stored in the gas storage portion 4 by having been adjusted to a fixed pressure flows suddenly into the piston pump 30 under vacuum. With a conventional technique without the gas storage portion 4, due to sudden inflow of gas into the piston pump 30, the flow rate of the gas flowing through the flow meter 3 increases suddenly as well and a sudden flow rate change can occur in a shorter time than a sampling time of the flow meter 3. Consequently, sampling distortion occurs, making it difficult to achieve a desired expansion ratio based on precise gas amount measurement.

However, with the first embodiment of the present invention, because the gas storage portion 4 is placed downstream of the flow meter 3, even if the amount of gas flowing into the piston pump 30 increases suddenly, the gas stored in the gas storage portion 4 can be supplied adequately. Consequently, the flow rate of the gas passing through the flow meter 3 does not change suddenly in the sampling time. Thus, according to the first embodiment of the present invention, even when the valve 5 is opened, the flow meter 3 can sample the flow rate properly.

After the valve 5 is opened, timing to close the valve 5 can be set to any of the following:

(1) the gas flow rate measured by the flow meter 3 becomes 0 (or the gas flow rate falls to or below a threshold), (2) fluctuations in the pressure of the gas coming out of the gas storage portion 4 (pressure detected by a pressure gage 8 described later in FIGS. 2 and 3) disappear and the gas pressure becomes constant (or a pressure fluctuation range of the gas falls to or below a threshold), and (3) a predetermined time elapses after the valve 5 is opened.

Item (1) indicates that gas is supplied into the cylinder of the piston pump 30 at constant pressure and stored in the gas storage portion 4 at the constant pressure and that there is no longer any gas flow. Thus, the valve 5 is closed and it is determined that it is time to prepare to supply gas for a next cycle. In the case of Item (2), the disappearance of gas pressure fluctuations downstream of the gas storage portion 4 indicates that there is no longer any gas flow from the gas storage portion 4 to the piston pump 30 and it is determined that it is time to prepare for next gas supply. For a pressure gage placed downstream of the gas storage portion 4, refer to other embodiments (the pressure gage 8 described in FIGS. 2 and 3). The predetermined time in Item (3) can be calculated in advance as the time required for the gas stored in the gas storage portion 4 at a fixed pressure to flow into the piston pump 30 of a predetermined volume under vacuum.

Also, the gas supply source 20 can be configured as a compressor adapted to supply gas at a relatively low pressure such as 0 to 1 MPa or 0 to 0.5 MPa. This makes it possible to further improve the flow measurement accuracy of the flow meter 2.

When a compressor is used as the gas supply source 20, a filter, oil mist separator, and regulator may be placed in a succeeding stage. However, such air equipment, especially the regulator, is provided separately from the regulator 2 of the gas supply system 1a and has essentially different workings.

Also, the gas supply source 20 is used not only for the gas supply system 1a, but also for driving and the like of various equipment, and a gas storage portion may be provided halfway along a gas supply pipeline. However, the gas storage portion is intended to make up for insufficient gas pressure supplied to various equipment and is provided separately from the gas storage portion 4 of the gas supply system 1a and has essentially different workings.

Regarding the type of gas, any of various gases can be adopted, including air (air at atmospheric pressure, low-pressure air, compressed air), carbon dioxide gas, nitrogen gas, oxygen, argon, and krypton. Also, when atmospheric air is used as the gas to be supplied to the paste material, the gas supply source 20 can be used, but by providing an air intake for use to take in atmospheric air, air at atmospheric pressure introduced through the air intake may be supplied to the gas supply system 1a alternatively. In that case, an air filter may be provided between the air intake and an inlet valve to filter air and remove dust and the like. Furthermore, instead of the gas supply source 20 and air intake, a configuration made up of a gas tank, an adjusting valve, and the like can be used, where the adjusting valve serves as a pressure-regulating mechanism adapted to adjust gas pressure. Regarding gas pressure, positive pressure higher than atmospheric pressure or negative pressure lower than atmospheric pressure can be used depending on manufacturing conditions at the time.

The use of low-pressure gas eliminates the need to give consideration to pressure safety in design. For example, components (pipes, valves, and the like) can be made of low-strength materials or wall thickness can be reduced. Furthermore, it becomes easy to control the gas flow rate and possible to improve reliability of gas injection and safety of handling. This makes it possible to reduce weight and size of an entire gas mixing system. Of course, the present invention also includes a mode of handling high pressure gas depending on the intended use and usage situation, and is not limited to the use of low-pressure gas.

Next, the mechanical foaming system 50 that mixes gas and paste material using the gas supply system 1a will be described using FIGS. 4 and 5. Note that in FIGS. 4 and 5, components similar to those described above will be denoted by reference numerals similar to those of corresponding components, and detailed description thereof will be omitted.

(First Example of Mechanical Foaming System)

Figure 4:
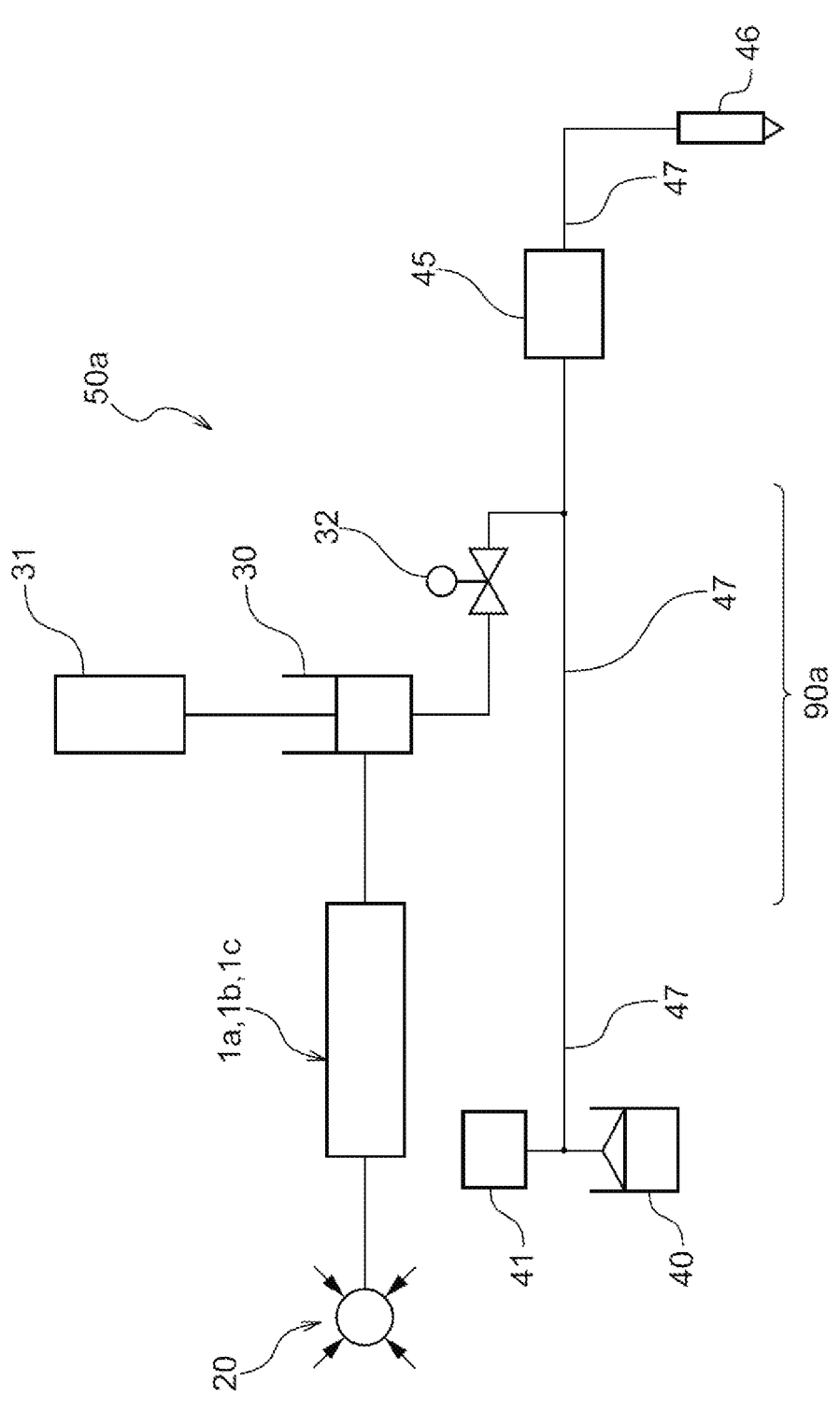
FIG. 4 is a schematic diagram of a first example of a mechanical foaming apparatus-system to which the gas supply system according to the first and second embodiments of the present invention are applied.

As means of mixing gas in paste material, a mechanical foaming system 50a of a first example shown in FIG. 4 includes the gas supply source 20, the gas supply system 1a, the piston pump 30 to discharge gas into a conduit space through which the paste material flows (where the conduit space is formed as a passage for the paste material formed by a conduit 47), a piston drive unit 31 adapted to drive the piston of the piston pump 30, and a discharge valve 32 adapted to open/close a gas supply path running from the piston pump 30 to the conduit 47.

Also, a mixing-discharging apparatus 90a of the mechanical foaming system 50a may include a tank 40 adapted to store the paste material, a pressure pump 41 adapted to force-feed the paste material stored in the tank 40 to the conduit 47, a mixer 45 adapted to stir the paste material with the gas mixed therein, and a nozzle 46 attached to a tip of a gun to discharge a mixture of the gas and paste material. Also, to detect that a fixed amount of paste material has flown through the pressure pump 41, mixer 45, and nozzle 46, a non-illustrated flow meter may be provided somewhere in a route.

In the mixing-discharging apparatus 90a, first, the piston of the piston pump 30 is driven to the top dead center by the piston drive unit 31. Consequently, a vacuum is created in the cylinder of the piston pump 30, the cylinder having a large defined volume. When the valve 5 (FIG. 1) is opened, an amount of gas precisely measured by the gas supply system 1a flows into the vacuum cylinder having the large defined volume. When a predetermined amount of gas is stored in the cylinder space of the piston pump 30, the valve 5 is closed. Note that according to the volume to be defined in the piston pump 30, a vacuum may be created by stopping upward movement of the piston before the physical top dead center is reached.

Next, the piston of the piston pump 30 is lowered toward a bottom dead center by the piston drive unit 31, and the gas inside the piston is compressed. Paste material is flowing through the conduit 47 at a constant flow rate, and when the discharge valve 32 is opened, gas flows into the paste material from the piston pump 30 and is mixed in the paste material. Note that the present invention includes not only a mode in which the discharge valve 32 opens after the piston of the piston pump reaches the bottom dead center in this step, but also a mode in which the discharge valve 32 opens while the piston is moving toward the bottom dead center and a mode in which the discharge valve 32 opens with the piston stopped somewhere between the top dead center and bottom dead center. Timing for the discharge valve 32 to open may be determined by detecting the position of the piston, pressure of the paste material, or gas pressure in the cylinder. Preferably the piston is set near the bottom dead center of the piston and desirably the gas pressure in the cylinder is higher than the pressure of the paste material flowing through the conduit.

A mixing-discharging apparatus 90a, in which the gas precisely measured by the gas supply system 1a is mixed in a fixed amount of paste material, makes it easy to obtain a desired expansion ratio.

(Second Example of Mechanical Foaming System)

Figure 5:
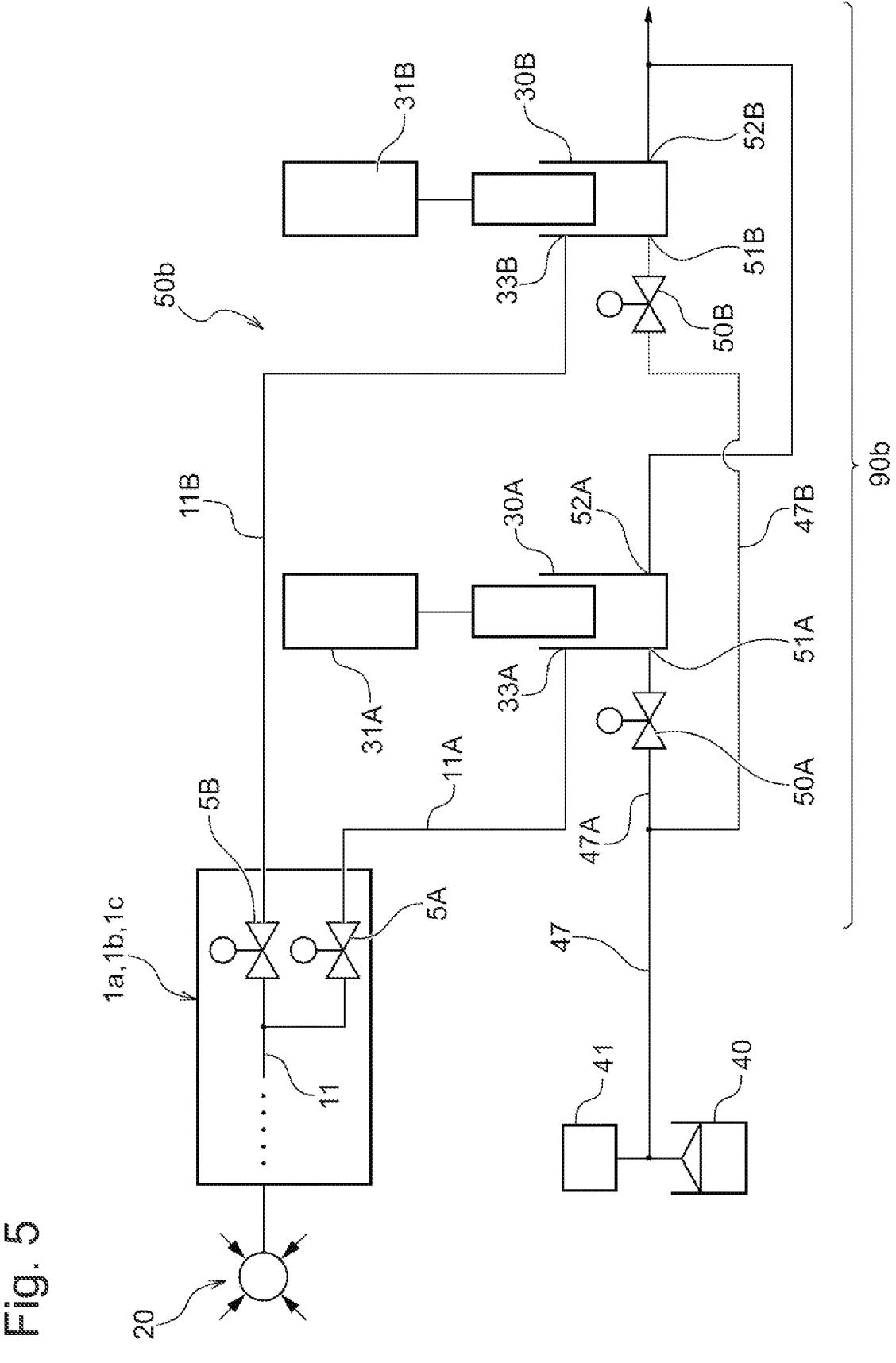
FIG. 5 is a schematic diagram of a second example of a mechanical foaming apparatus-system to which the gas supply system according to the first and second embodiments of the present invention are applied.

A mixing-discharging apparatus 90b of a second example shown in FIG. 5 is made up of two piston pumps 30A and 30B placed in parallel. According to this difference in configuration, the gas supply system 1a is configured such that the gas introduction path 11 is branched into two gas introduction paths 11A and 11B, which are then connected to gas inlet ports 33A and 33B of the piston pumps 30A and 30B, respectively.

Another difference from the first mixing-discharging apparatus 90a is that the mixing-discharging apparatus 90b of the second example is configured such that in addition to gas, paste material is introduced into cylinders of the piston pumps 30A and 30B and the gas and paste material are mixed in the cylinders. According to this difference in configuration, the conduit 47 extending from the tank 40 of the paste material is branched into two conduits 47A and 47B, which are then connected to material inlet ports 51A and 51B of the piston pumps 30A and 30B, respectively, via on-off valves 50A and 50B.

In the mixing-discharging apparatus 90b, first, pistons of the piston pumps 30A and 30B are driven to top dead centers by piston drive units 31A and 31B. Consequently, vacuums are created in the cylinders of the piston pumps 30A and 30B, the cylinders having defined volumes. When valves 5A and 5B are opened, amounts of gas precisely measured by the gas supply system 1a flow into the vacuum cylinders having the defined volumes. Subsequently, the valves 5A and 5B are closed, and then the valves 50A and 50B are opened and the pressure pump 41 is operated, causing the paste material to flow into the piston pumps 30A and 30B via the conduits 47A and 47B. When predetermined amounts of gas and predetermined amounts of paste material are stored in the cylinders of the piston pumps 30A and 30B, the valves 50A and 50B are closed.

Next, the pistons of the piston pumps 30A and 30B are lowered to bottom dead centers by the piston drive units 31A and 31B, and the gas and paste material are pushed out of the pistons through outlet ports 52A and 52B. When the mixture pushed out is flowing through piping, the mixture is further mixed by a non-illustrated mixer, and consequently gas bubbles are broken into fine bubbles and distributed uniformly in the paste material.

Note that the mixing-discharging apparatus 90b operates the piston pumps 30A and 30B alternately in different phases such that foam will be discharged continuously without interruption. Alternatively, to increase an amount of discharge at a time, the piston pumps 30A and 30B may be operated concurrently in phase. One, or more than two piston pumps may be installed. In the latter case, each set of two or more of the plural piston pumps can perform continuous discharge operation and different sets can operate in parallel.

Again, the mixing-discharging apparatus 90b of the second example, in which the gas precisely measured by the gas supply system 1a is introduced into the piston pumps, makes it easy to obtain a desired expansion ratio.

Second Embodiment

Next, a gas supply system 1b according to a second embodiment will be described using FIG. 2. Note that in FIG. 2, components similar to those of the first embodiment will be denoted by reference numerals similar to corresponding components of the first embodiment, and detailed description thereof will be omitted.

Figure 2:
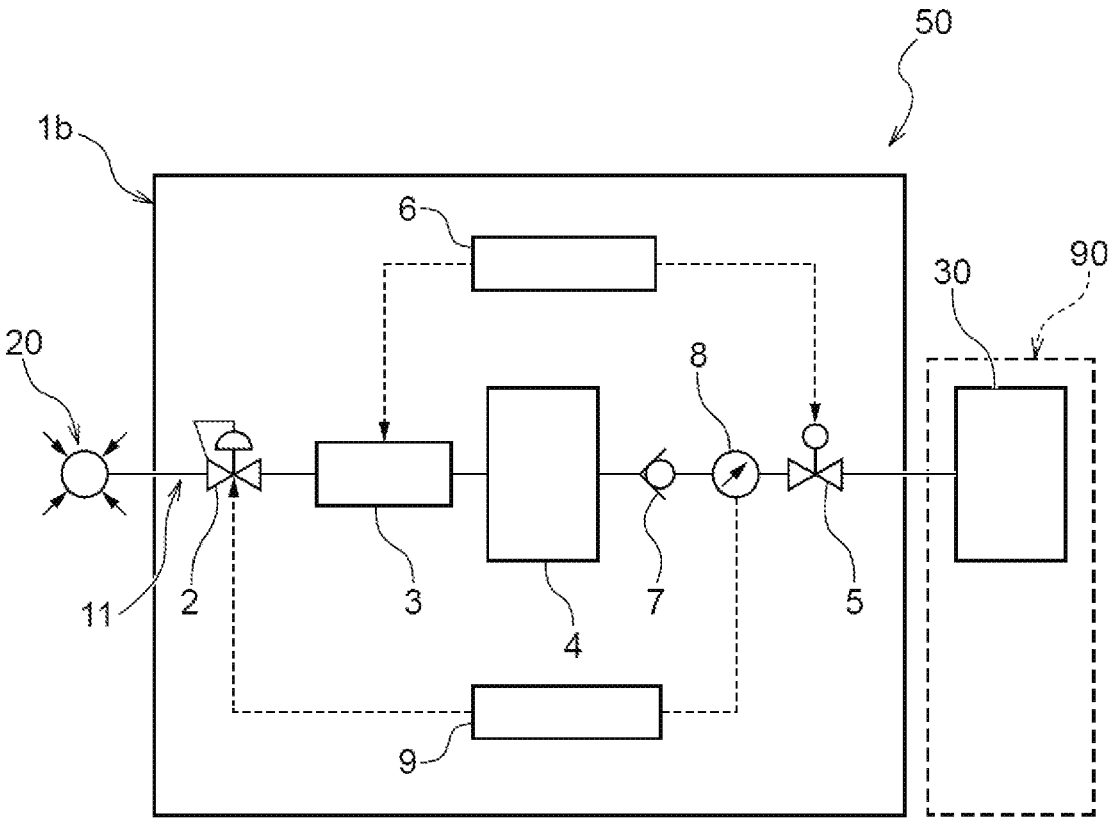
FIG. 2 is a block diagram of a gas supply system according to a second embodiment of the present invention.

As shown in FIG. 2, the gas supply system 1b according to the second embodiment is configured by further adding a check valve 7 placed between the gas storage portion 4 and valve 5, a pressure gage 8 placed between the check valve 7 and valve 5, and a pressure controller 9 adapted to control the regulator 2 based on gas pressure detected by the pressure gage 8 to the gas supply system 1a according to the first embodiment.

The placement of the check valve 7 makes it possible to prevent backflow of material and thus prevent breakage of the flow meter 3. Preferably the pressure difference across the check valve 7 when the gas is at rest is 0.01 MPa or less. This is because gas flow rate measurement errors increase with increases in the pressure difference.

Also, since the regulator 2 is controlled such that the pressure detected by the pressure gage 8 fall within a predetermined range, a more precise amount of gas can be introduced into the vacuum chamber 30. Since the regulator 2 according to the present embodiment is controlled as described above, it will be understood that the regulator placed in the gas supply source 20 is different from the regulator of the above example.

The gas supply system 1b according to the second embodiment is also applicable to the mixing-discharging apparatuses 90a and 90b described above.

Note that in the second embodiment, it is conceivable to add only the check valve 7 or only the pressure gage 8 and pressure controller 9 to the first embodiment.

Third Embodiment

Figure 3:
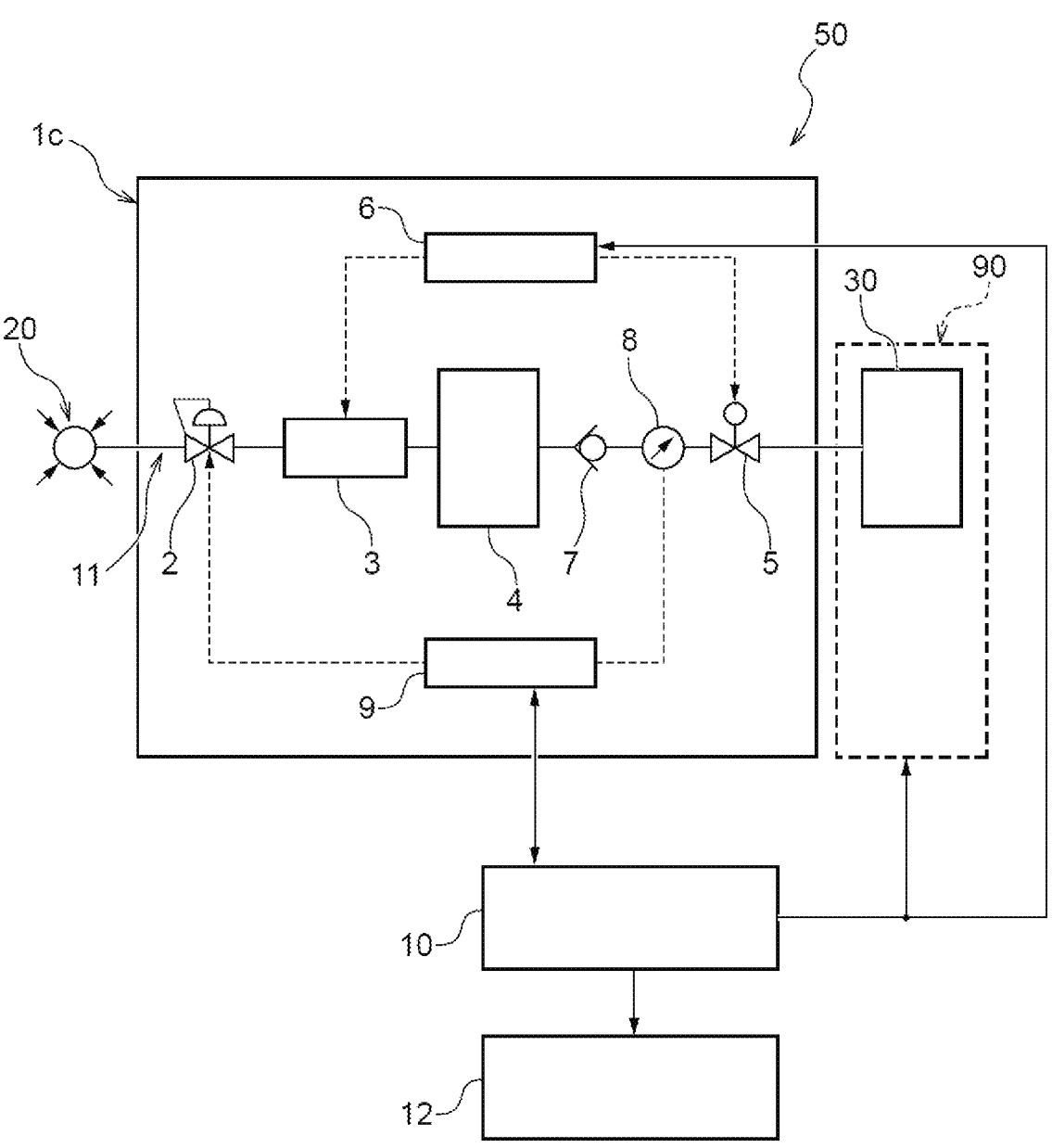
FIG. 3 is a block diagram of a gas supply system according to a third embodiment of the present invention.

Next, a gas supply system 1c according to a third embodiment will be described using FIG. 3. Note that in FIG. 3, components similar to those of the first and second embodiments will be denoted by reference numerals similar to corresponding components of the first and second embodiments, and detailed description thereof will be omitted.

The gas supply system 1c according to the third embodiment is configured by further adding a main controller 10 and display unit 12 to the gas supply system 1b according to the second embodiment, where the main controller 10 controls the flow controller 6, pressure controller 9, and mixing-discharging apparatus 90 while the display unit 12 graphically represents the gas flow rate.

The provision of the main controller 10 and display unit 12 makes it possible to monitor and control the gas supply system 1c and mixing-discharging apparatus 90 in an integrated manner and mix more precise amounts of gas and paste material. For example, the amount of gas in the cylinder space of the piston pump 30 is calculated during the period after the valve 5 is opened until the valve 5 is closed as described in the first embodiment, and the main controller 10 determines whether the calculated amount of gas equals a predetermined amount and displays the result on the display unit 12, making it easy for an operator to determines whether the system is being operated properly.

Also, for example, in case the amount of gas calculated and stored in the cylinder space does not fall within a range between preset upper and lower limits of the amount of gas stored in the cylinder space, the main controller 10 may be designed to be able to issue a system stop command and automatically stop the system. Alternatively, the display unit 12 may be designed to display calculation results of the gas amount and a range between upper and lower limits of the gas amount, allowing the operator to stop the system manually or to set an upper and lower range via the display unit such that the controller 10 issue the above-mentioned system stop command based on the upper and lower range. Furthermore, to find trouble in advance and help investigate the cause of the trouble, the display unit 12 may be designed to display a history (time variation) of the gas flow rates measured by the flow meter 3.

The gas supply system 1c according to the third embodiment is also applicable to the mixing-discharging apparatuses 90a and 90b described above.

The above are embodiments of the present invention, but the present invention is not limited to the above examples and desired changes may be made as appropriate within the scope of the present invention. For example, although systems to which the gas supply system of the present invention are applied have been described by citing the mechanical foaming systems shown in FIGS. 4 and 5, the present invention is not limited to these examples, and is applicable to any system capable of supplying precisely measured gas to a space of a predetermined volume under vacuum.

REFERENCE SIGNS LIST 1a, 1b, 1c Gas supply system
2 Regulator
3 Flow meter
4 Gas storage portion
5 Valve
6 Flow controller
7 Check valve
8 Pressure gage
9 Pressure controller
10 Main controller
11, 11A, 11B Gas introduction path
12 Display unit
30, 30A, 30B Piston pump (vacuum chamber)
50, 50a, 50b Mechanical foaming system
90, 90a, 90b Mixing-discharging apparatus

The invention claimed is:

1. A gas supply system for a mixing-discharging apparatus equipped with a piston pump having a predetermined volume to mix gas and paste material, the gas supply system comprising:
   a regulator adapted to control pressure of gas supplied from a gas supply source;
   a flow meter adapted to measure a flow rate of the gas;
   a gas storage portion adapted to store the gas; and
   a valve adapted to open and close a gas introduction path to the mixing-discharging apparatus,
   wherein in the gas storage portion, a volume ratio of the gas storage portion to the predetermined volume of the piston pump is established between 4 and 100 such that sudden flow rate fluctuations in a flow path in which the flow meter is placed do not occur in a shorter amount of time than a sampling time of the flow meter when the valve is open and gas is supplied to the piston pump of the mixing-discharging apparatus, the sudden flow rate fluctuations being flow rate fluctuations in the shorter amount of time which would cause sampling distortion in measurements of the flow meter.

2. The gas supply system according to claim 1, wherein the flow meter is placed upstream of the gas storage portion and downstream of the regulator with respect to a flow of the gas.

3. The gas supply system according to claim 1, wherein the volume ratio of the gas storage portion to the predetermined volume of the piston pump is between 8 and 50.

4. The gas supply system according to claim 3, wherein a volume of the gas storage portion is 20 cc to 2000 cc.

5. The gas supply system according to claim 4, wherein a material of the gas storage portion is SUS.

6. The gas supply system according to claim 1, wherein the regulator is a precision regulator.

7. The gas supply system according to claim 6, wherein the precision regulator is a constant bleed regulator or a nozzle flapper regulator.

8. The gas supply system according to claim 1, further comprising a check valve installed on a gas flow path between the gas storage portion and the valve.

9. The gas supply system according to claim 8, wherein a pressure difference between gases in front and back of the check valve is 0.01 MPa or less when gas does not flow.

10. The gas supply system according to claim 8, wherein a pressure of gas supplied to the regulator is 1 MPa or less.

11. The gas supply system according to claim 1, further comprising a controller adapted to control the gas supply system, wherein
   the controller is configured to:
   open the valve in a state in which the gas supplied from the gas supply source is subjected to pressure regulation by the regulator and stored in the gas storage portion, thereby sending gas into a space of the predetermined volume of the piston pump and storing the gas therein;
   measure the flow rate of the gas with the flow meter;
   calculate an amount of the gas stored in the piston pump from the flow rate of the gas measured by the flow meter; and
   close the valve when a predetermined closing condition is satisfied.

12. The gas supply system according to claim 11, wherein the controller determines whether the calculated amount of the gas stored in the piston pump falls within a preset range between upper and lower limits and issues a system stop command when the amount of the gas falls outside the range between the upper and lower limits.

13. The gas supply system according to claim 11, further comprising a display unit adapted to display the calculated amount of the gas stored in the piston pump and a range between upper and lower limits representing an appropriate range of the amount of the gas.

14. The gas supply system according to claim 13, wherein the display unit further displays a time variation of the flow rate measured by the flow meter.

15. The gas supply system according to claim 11, further comprising a pressure gage adapted to detect a pressure of the gas, the pressure gage being installed on a gas flow path between the gas storage portion and the valve.

16. The gas supply system according to claim 15, wherein the predetermined closing condition for closing the valve is any of conditions (1) to (3) below:
   (1) a gas flow rate measured by the flow meter falls to 0 or falls to or below a threshold;
   (2) gas pressure fluctuations detected by the pressure gage disappear or a pressure fluctuation range of the gas falls to or below a threshold; and
   (3) a predetermined time elapses after the valve is opened.

17. The gas supply system according to claim 1, wherein the gas storage portion is a gas tank.

18. The gas supply system according to claim 1, wherein the gas storage portion is made up of a pipe having a length and a sectional area that achieve a predetermined volume ratio to a predetermined volume of the piston pump.

19. A mechanical foaming system comprising:
   the gas supply system according to claim 1; and
   a mixing-discharging apparatus equipped with a piston pump supplied with gas from the gas supply system.

20. The mechanical foaming system according to claim 19, further comprising a controller adapted to control the gas supply system and the mixing-discharging apparatus,
   wherein the piston pump of the mixing-discharging apparatus includes:
   a cylinder connected to the gas supply system; and
   a piston driven up and down in the cylinder,
   wherein the mixing-discharging apparatus further includes:
   a material supply apparatus adapted to supply paste material;

a conduit for the paste material, the conduit being connected to the material supply apparatus; and a discharge valve adapted to open or close a gas supply path from the cylinder to the conduit, and wherein the controller is configured to:

move the piston upward in the cylinder with the discharge valve closed;

introduce gas from the gas supply system into a cylinder space formed in the cylinder by upward movement of the piston and having a fixed volume;

pour a fixed amount of the paste material to the conduit from the material supply apparatus;

compress the gas by moving the piston downward; and open the discharge valve and thereby mix discharged gas in the paste material.

21. The mechanical foaming system according to claim 19, further comprising a controller adapted to control the gas supply system and the mixing-discharging apparatus, wherein the piston pump of the mixing-discharging apparatus includes:

a cylinder connected to the gas supply system; and a piston driven up and down in the cylinder, wherein the mixing-discharging apparatus further includes:

a material supply apparatus adapted to supply paste material; and a material valve installed between the material supply apparatus and the cylinder, and wherein the controller is configured to:

move the piston upward in the cylinder with the material valve closed;

introduce gas from the gas supply system into a cylinder space formed in the cylinder by upward movement of the piston and having a fixed volume;

supply the paste material to the cylinder space from the material supply apparatus by opening the material valve; and discharge the gas and the paste material from the cylinder by moving the piston downward.

22. A method for supplying gas to the piston pump in the mechanical foaming system according to claim 20, the method comprising:

opening the valve in a state in which the gas supplied from a gas supply source is subjected to pressure regulation by the regulator and stored in the gas storage portion, thereby sending gas into a space of the predetermined volume of the piston pump and storing the gas therein;

measuring the flow rate of the gas with the flow meter;

calculating an amount of the gas stored in the cylinder space formed in the cylinder by upward movement of the piston and having a fixed volume from the flow rate of the gas measured by the flow meter; and closing the valve when a predetermined closing condition is satisfied.

23. The method according to claim 22, wherein the predetermined closing condition for closing the valve is any of conditions (1) to (3):

(1) a gas flow rate measured by the flow meter falls to 0 or falls to or below a threshold;

(2) gas pressure fluctuations detected by the pressure gage disappear or a pressure fluctuation range of the gas falls to or below a threshold; and (3) a predetermined time elapses after the valve is opened.

24. The method according to claim 22, further comprising:

determining whether the calculated amount of the gas stored in the cylinder space falls within a preset range between upper and lower limits; and stopping the mechanical foaming system when the amount of the gas falls outside the range between the upper and lower limits.

25. The method according to claim 22, further comprising:

closing the valve;

moving the piston downward; and then mixing the gas and the paste material.

26. The method according to claim 25, further comprising discharging and applying the mixed gas and paste material on a surface.

* * * * *